United States Patent [19]

Pierson

[11] 4,072,203

[45] Feb. 7, 1978

[54] SMALL, PERSONAL, ALL TERRAIN VEHICLE

[76] Inventor: Neil W. Pierson, P.O. Box 98, Roseau, Minn. 56751

[21] Appl. No.: 686,592

[22] Filed: May 14, 1976

[51] Int. Cl.² ............................................. B62D 55/00
[52] U.S. Cl. .................................. 180/9.44; 180/9.5; 280/28.5; 305/44
[58] Field of Search ...................... 180/5 R, 9.44, 9.5, 180/9.52, 9.54; 280/28.5; 305/44, 35 R; 115/1 R

[56] References Cited

U.S. PATENT DOCUMENTS

| | | | |
|---|---|---|---|
| 2,648,392 | 8/1953 | Brown | 180/23 |
| 2,827,715 | 3/1958 | Wagner | 37/117.5 |
| 2,884,083 | 4/1959 | McColl | 180/12 |
| 3,199,620 | 8/1965 | Wheeler | 180/9.58 |
| 3,250,577 | 5/1966 | Olson | 305/13 |
| 3,262,513 | 7/1966 | Henriksson | 180/54 |
| 3,328,049 | 6/1967 | Luterbach | 280/106 |
| 3,334,702 | 8/1967 | Granryd | 180/51 |
| 3,340,949 | 9/1967 | Molby | 180/79.2 |
| 3,357,513 | 12/1967 | Sundberg | 180/77 |
| 3,360,925 | 1/1968 | Zimmerman | 60/19 |
| 3,370,422 | 2/1968 | Carlson | 60/52 |
| 3,434,739 | 3/1969 | Schoonover | 280/492 |
| 3,435,908 | 4/1969 | Sunderlin | 180/9.44 |
| 3,439,937 | 4/1969 | Dixon | 280/446 |
| 3,451,494 | 6/1969 | Kowalik | 180/9.24 |
| 3,454,123 | 7/1969 | Lewis | 180/23 |
| 3,455,405 | 7/1969 | Parent | 180/9.5 |
| 3,473,619 | 10/1969 | Dion | 180/9.44 |
| 3,521,720 | 7/1970 | Korotkin | 180/51 |
| 3,548,962 | 12/1970 | Best | 180/9.44 |
| 3,565,198 | 2/1971 | Ames | 180/9.44 |
| 3,630,302 | 12/1971 | Holland | 180/12 |
| 3,650,343 | 3/1972 | Helsell | 180/5 R |
| 3,652,106 | 3/1972 | Waterman | 280/405 R |
| 3,741,331 | 6/1973 | Kowalik | 180/9.44 |
| 3,773,129 | 11/1973 | Anderson | 180/14 B |
| 3,789,942 | 2/1974 | Kowalik | 180/9.44 |
| 3,826,388 | 7/1974 | Oldenburg | 214/140 |
| 3,937,289 | 2/1976 | Dickinson | 180/9.44 |

Primary Examiner—Joseph F. Peters, Jr.
Assistant Examiner—John A. Carroll
Attorney, Agent, or Firm—Wicks & Nemer

[57] ABSTRACT

A small, personal, all terrain vehicle is disclosed of the articulated, multi-unit type. A first and second unit, having track members pivotably mounted thereto, are also pivotably and rotatably interconnected to each other. A motor is provided in the second unit for driving the track members of the first and second units. The first unit includes a seat for a driver and a steering mechanism causing the pivoting of the second unit with respect to the first unit. The all terrain vehicle is of a small size, in the preferred embodiment being four feet wide and eight feet long, for the personal transportation of the driver. The all terrain vehicle provides advantageous weight distribution in that the weight of the driver of the all terrain vehicle is located in the first unit to provide substantial traction to the track members of the first unit and the weight of the motor is located in the second unit to provide substantial traction to the track members of the second unit. The interconnection of the first and second units and the pivotable interconnection of the track members to the first and second units assure that all four track members engage the travel surface.

13 Claims, 9 Drawing Figures

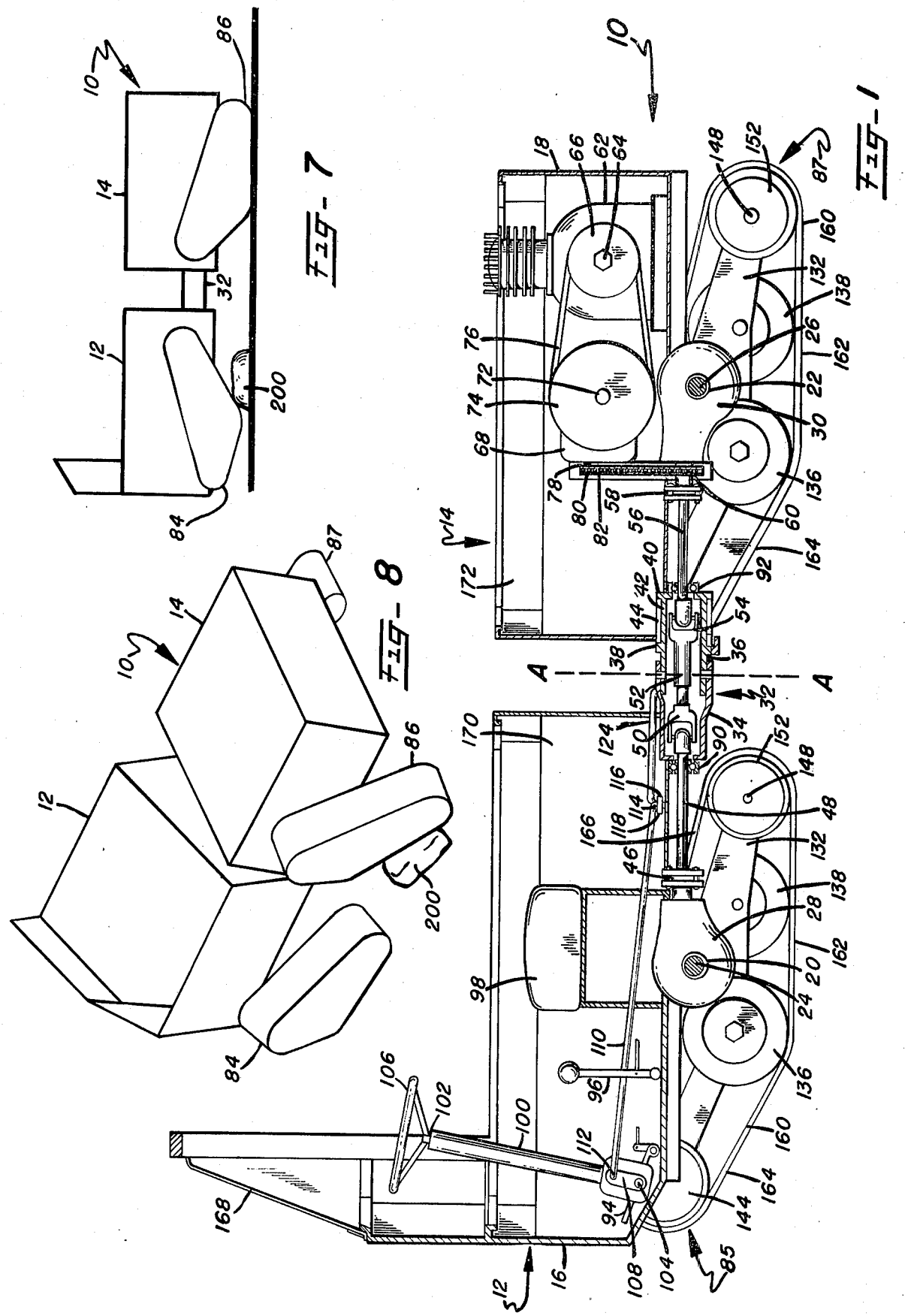

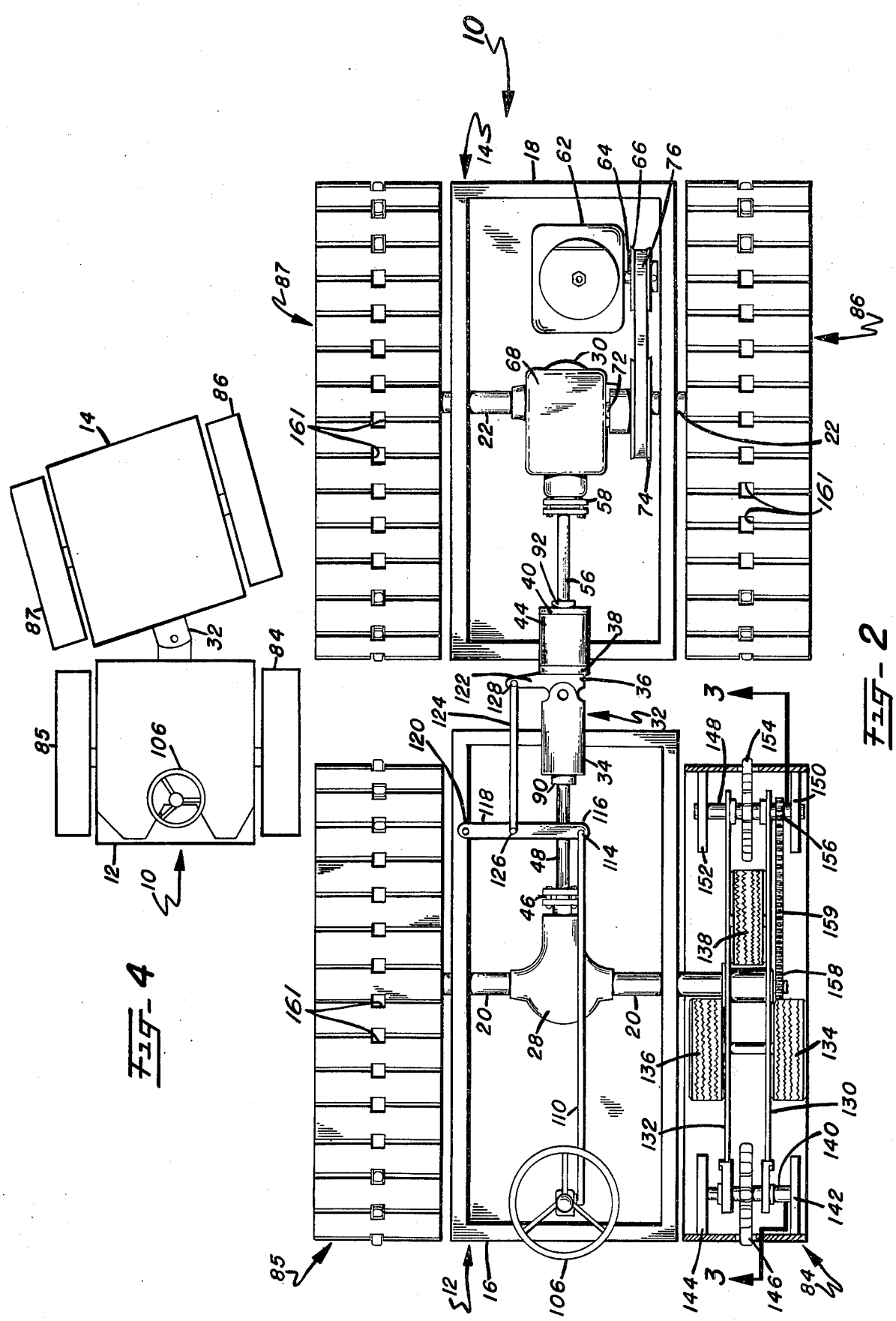

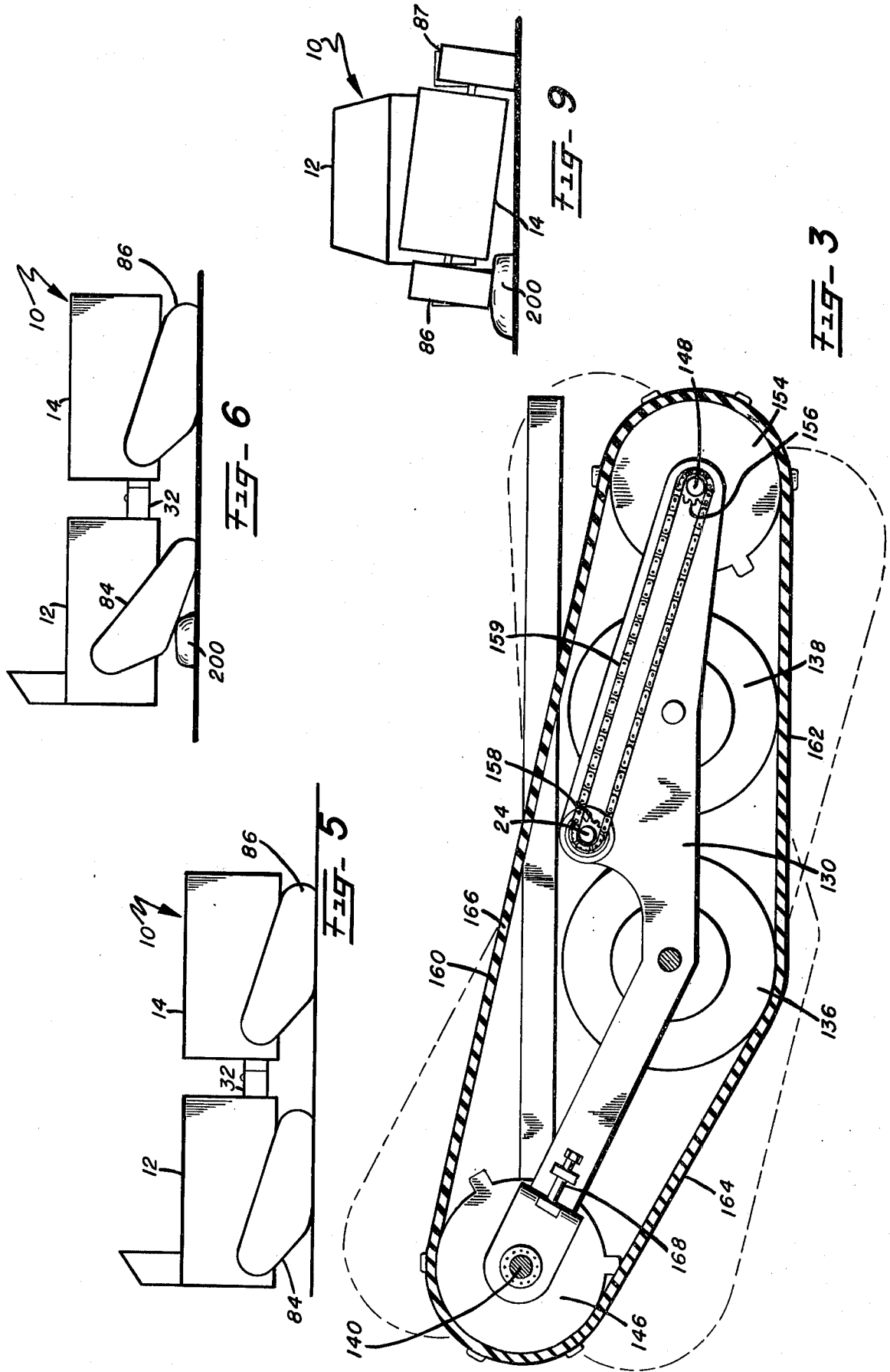

SMALL, PERSONAL, ALL TERRAIN VEHICLE

BACKGROUND

This invention relates generally to all terrain vehicles and more specifically to all terrain vehicles of the articulated, multi-unit type.

With the advent and increasing popularity of small transportation vehicles such as snowmobiles, motorcycles, and similar types, an increasing demand has arisen for vehicles able to travel over all types of terrain including hard rough terrain, steep inclines, over snow, marshland, and other and similar types of travel surfaces. Such a vehicle must give maximum traction, stability, and floatation per square inch of track required to propel the vehicle over these terrains. Further, such vehicles should allow use during the entire calendar year. Additionally, the vehicle should be of a very small size allowing the personal transportation of the driver and require a motor of minimum size having a low energy requirement.

SUMMARY

The present invention solves the above and other problems of vehicles by providing a small, personal, all terrain vehicle of the articulated, multi-unit type including a first unit and a second unit pivotally and rotatably interconnected with the first unit. Track members, pivotally mounted to the units, are driven by a motor which is located in the second unit. The first unit includes means for receiving the driver and means for steering the vehicle by pivoting the second unit with respect to the first unit.

Therefore, it is a primary object of the present invention to provide a novel all terrain vehicle.

It is also an object of this invention to provide a novel, small, personal, all terrain vehicle.

It is also an object of this invention to provide a novel, small, personal, all terrain vehicle of the articulated, multi-unit type.

It is also an object of this invention to provide a novel all terrain vehicle having novel track members.

It is also an object of this invention to provide a novel, small, personal, all terrain vehicle which is flexible enough to follow very bumpy or uneven terrain and yet give the maximum traction, stability, and floatation per square inch of track required to propel the vehicle over the terrain.

It is also an object of this invention to provide a novel small, personal, all terrain vehicle that will operate in all types of terrain including hard rough terrain or on steep inclines, over snow, marshland, and other and similar types of travel surfaces.

These and further objects and advantages of the present invention will become clearer in light of the following detailed description of an illustrative embodiment of this invention described in connection with the drawings.

DESCRIPTION OF THE DRAWINGS

The illustrative embodiment may best be described with reference to the accompanying drawings where:

FIG. 1 shows a cross-sectional, side view of an all terrain vehicle according to the teachings of the present invention.

FIG. 2 shows a cross-sectional, top view of the all terrain vehicle of FIG. 1.

FIG. 3 shows a cross-sectional view of the apparatus of FIG. 2 according to section line 3—3 of FIG. 2.

FIGS. 4–9 show diagrammatic sketches of the operation of the all terrain vehicle of FIGS. 1–3.

All figures are drawn for the ease of explanation of the basic teachings of the present invention only. Extensions of the figures with respect to number, position, relationship, and dimensions of the parts to form preferred embodiment will be explained or will be within the skill of the art after the following teachings of the present invention have been read and understood.

DESCRIPTION

In the figures, a small, personal, all terrain vehicle of the articulated, multi-unit type according to the teachings of the present invention is shown and generally designated 10. Vehicle 10 includes a first unit 12 and a second unit 14. First unit 12 includes a body and frame member 16 and second unit 14 includes a body and frame member 18. A first axle 20 is carried by first unit 12 and a second axle 22 is carried by second unit 14. Axles 20 and 22 are formed of hollow housing members and rotatably carry a first axle shaft 24, and a second axle shaft 26, respectively, therewithin. Axle 20 is shown in its preferred form as including first differential member 28 operatively connected to axle shaft 24. Axle 22 is shown in its preferred form as including second differential member 30 operatively connected to axle shaft 26. Differential members 28 and 30 may be of the heavy duty "Dana" differential type.

Member 32 is provided for connecting second unit 14 to first unit 12, for allowing second unit 14 to rotate about a longitudinal axis of vehicle 10 which is parallel to the intended direction movement of vehicle 10 with respect to the first unit 12, and for allowing second unit 14 to pivot about a generally vertical axis A which is perpendicular to the longitudinal axis and intended direction movement of vehicle 10 with respect to first unit 12. Therefore, member 32 rotatably and pivotally interconnects units 12 and 14 together allowing vehicle 10 to flex as it moves upon the travel surface for insuring that all track members engage the travel surface, as will be explained further hereinafter. Further, member 32 allows the steering of vehicle 10 and also allows the transfer of power through itself between units 12 and 14 as will also be explained further hereinafter.

Generally, member 32 includes a first cylindrical member 34 rigidly attached to body and frame 16 of first unit 12 such as by welding cylindrical member 34 to body and frame member 16. A second cylindrical member 36 is provided and is pivotally attached to cylindrical member 34 about axis A. Cylindrical member 36 includes a first stop member 38 and a second stop member 40 which extend exteriorly around the entire circumference of member 36 and form a cylindrical cavity band 42 therebetween. A third cylindrical member 44 having a diameter slightly greater than a diameter of cylindrical member 36 is located within cavity band 42 and rotatable around and upon cylindrical member 36. Cylindrical member 44 is rigidly attached to body and frame member 18 of second unit 14 such as by welding cylindrical member 44 to body and frame member 18.

Differential member 28 of first unit 12 is operatively connected to a flexible connector 46. Flexible connector 46 is then operatively connected to a shaft 48. Shaft 48 is, in turn, operatively connected to a universal joint 50. Universal joint 50 is then operatively connected to splined slip coupling 52. Coupling 52 allows the drive shaft to increase in length along the longitudinal axis parallel to the intended movement direction of vehicle 10 as the all terrain vehicle moves about the travel surface. Slip coupling 52 is operatively connected to a further universal joint 54. Universal joint 54 is, in turn, operatively connected to shaft 56. Shaft 56 is then operatively connected to flexible connector 58. Flexible connector 58 is operatively connected to second differential member 30 of second unit 14.

Therefore, it can be seen that flexible connectors 46 and 58 and universal joints 50 and 54 allow the drive shaft to flex as the all terrain vehicle moves about the travel surface. Further, it should be noted that flexible connectors 46 and 48, universal joints 50 and 54, shafts 48 and 56, and splined slip coupling 52 form the drive shaft and operatively connect the first differential member 28 of the first unit 12 to the second differential member 30 of the second unit 14 to thus transfer power between differential members 28 and 30 of first and second units 12 and 14, respectively. A sprocket 60 is further operatively connected to flexible connector 58 and second differential member 30, the purpose of which will be explained further hereinafter.

Shaft 48 is rotatably carried by bearing 90 which is attached to cylindrical member 34. Shaft 56 is rotatably carried by bearing 92 which is attached to cylindrical member 36. Therefore, it can be seen that the operative interconnection between first and second differential members 28 and 30 passes through cylindrical members 34, 36, and 44 of member 32 such that member 32 allows the transfer of power through the interior of cylindrical members 34, 36 and 44 of member 32 between units 12 and 14 of vehicle 10.

A motor 62 having a power output shaft 64 is further provided in second unit 14. Motor 62 may be of the air cooled, gasoline type as shown in the preferred embodiment of the present invention for example, a 2 cycle Kolher Electric Start engine of either 340 or 440 cubic centimeter size. A belt pulley 66 is operatively attached to output shaft 64 of motor 62.

A transmission member 68 is further provided in second unit 14 having two forward speeds and one reverse speed. Transmission member 68 is of the conventional type with the exception that input shaft 72 is at right angles to output shaft 78. A belt pulley 74 is operatively attached to input shaft 72 of transmission member 68. A rubber type belt 76 between pulleys 66 and 74 operatively connects motor 62 to member 68. Pulleys 66 and 74 and belt 76 form a clutch unit such as the Salsbury automatic torque conventer clutch.

Member 68 further includes an output shaft 78 having a sprocket 80 operatively connected thereto. A link type chain 82 is located between sprockets 60 and 80 and operatively connects member 68 to the drive shaft.

Therefore, pulley 66, belt 76, pulley 74, member 68, sprocket 80, chain 82, sprocket 60, differential member 30, axle shaft 26, flexible connectors 46 and 58, shafts 48 and 56, universal joints 50 and 54, splined slip coupling 52, differential member 28 and axle shaft 24 comprises the power train means for providing movement of a first track member 84, a second track member 85, a third track member 86, and a fourth track member 87.

An accelerator pedal 94 is provided in first unit 12 and is operatively connected to motor 62 as by conventional linkage members, not shown, for varying the output of motor 62 in the conventional fashion. A shifting lever 96 is further provided in first unit 12 and is operatively connected to member 68 as by conventional linkage members, not shown, for engaging the transmission and for changing the output gear ratio and direction of the output of member 68 in the conventional fashion. Member 98 is provided in first unit 12 for receiving and allowing the seating of a single driver within unit 12.

Steering means, located in the first unit, is further provided for steering the all terrain vehicle 10 by pivoting second unit 14 with respect to first unit 12 about the vertical axis A which is perpendicular to the longitudinal axis and intended direction movement of vehicle 10. The steering means generally includes steering linkage arms 110, 118, and 124. An arm 122 is further provided and is rigidly attached perpendicularly to axis A in a generally horizontal manner to cylindrical member 36 of member 32. Linkage arm 118 has a first end 116 pivotably connected to second end 114 of arm 110 and has a second end 120. Second end 120 of arm 118 is pivotably connected to body and frame member 16 of first unit 12. Arm 124 has a first end pivotably connected to arm 118 at a point between ends 116 and 120 of arm 118 and has a second end 128 pivotably attached to arm 122.

To effect pivoting of second unit 14 with respect to first unit 12 about axis A, arm 110 is moved in a longitudinal direction thereby causing arm 118 to pivot with respect to body and frame member 16 of first unit 12, in turn, causing movement of arm 124. The movement of arm 124 is transferred via arm 122 to member 32 causing cylindrical member 34 to pivot about axis A with respect to cylindrical member 36. Thus, second unit 14 pivots about axis A with respect to first unit 12 as diagrammatically shown in FIG. 4.

Suitable apparatus can then be provided for moving arm 110 such as the steering wheel assembly as shown in the preferred embodiment of the present invention. Generally, a rotatable shaft 100 is provided having a first end 102 and is rotatably carried by body and frame member 16 of unit 12. A steering wheel 106 is attached to first end 102 of shaft 100 for rotating rotatable shaft 100. A spindle shaft 104 is further provided and is operatively connected to rotatable shaft 100 by conventional gearing. A crank arm 108 is operatively connected to spindle shaft 104. First end 112 of arm 110 is pivotably connected to crank arm 108.

Therefore, when an operator turns the steering wheel 106, shaft 100 is rotated causing rotation of shaft 104 causing crank arm 108 to move. Due to the pivotable interconnection of arm 110 to crank arm 108, arm 110 is thereby moved in a longitudinal direction.

It should be noted that due to flexible connections 46 and 48, universal joints 50 and 54, and coupling 52, the drive shaft of vehicle 10 flexes as second unit 14 pivots with respect to first unit 12 about axis A.

As best seen in FIG. 3, track member 84 generally includes a first track frame member 130 and a second track frame member 132. Frame members 130 and 132 are pivotably mounted transversely and symetrically around axle 20 and in a parallel spaced relation. Frame members 130 and 132 rotatably carry intermediate wheels, shown as a first rubber tire 134, a second rubber tire member 136, and a third rubber tire member 138, located adjacent to axle 20. Tires 134 and 136 are located parallel to each other and in front of axle 20 and on the opposite, outside sides of members 130 and 132. Wheel 138 is located behind axle 20 and also between members 130 and 132. It should be noted that the pivotable mounting of track frame members 130 and 132 is located above and between intermediate wheels 134 and 136 and intermediate wheel 138. The location of the pivot point of frame members 130 and 132 is important in that it creates a balanced action with regard to track members 84–87 and the terrain when vehicle 10 is in motion as will be explained further hereinafter.

It can now be appreciated that wheels 134 and 136 and wheel 138 are symetrically mounted with respect to the pivot point of frame members 130 and 132, or in other words axles 20 and 22. The pivot of wheels 134 and 136 is located on the same diameter or equadistant from the pivot point of frame members 130 and 132 as the pivot of wheel 138.

A first shaft 140 is carried by the extreme forward ends of members 130 and 132. A first idler wheel 142 and a second idler wheel 144 are carried by shaft member 140 on opposite, outside sides of members 130 and 132. A first idler sprocket 146 is carried to shaft 140 between members 130 and 132. It should be noted that wheels 142 and 144 and sprocket 146 are in rotatable relation with members 130 and 132. Therefore shaft 140 may be rotatably carried by members 130 and 132, or wheels 142 and 144 and sprocket 146 may be rotatably carried by shaft 140, or both.

A second, rotatable shaft 148 is rotatably carried by the extreme rearward ends of members 130 and 132. A third idler wheel 150 and a fourth idler wheel 152 are carried by shaft 148 on opposite, outside sides of members 130 and 132. Wheels 150 and 152 may be either rigidly attached to or rotatably carried by shaft 148. A second sprocket 154 is rigidly attached to shaft 148 between members 130 and 132. A further sprocket 156 is rigidly attached to shaft 148 between member 130 and idler wheel 150.

A sprocket 158 is operatively connected to axle shafts 24 of axle 20. A link type chain 159 operatively connects between sprockets 156 on track member 84 and sprocket 158. A track 160 having a plurality of regularly spaced openings 161 formed therein for receiving the teeth of sprockets 146 and 154 is further provided. Track 160 is formed in the conventional manner of the endless, rubber type and extends around idler wheels 150 and 152 and sprocket 154, to wheel 138, to wheels 134 and 136, around idler wheels 142 and 144 and sprocket 146, and back to idler wheels 150, 152 and sprocket 154. A threaded bolt type tensioning and tightener apparatus 168 is further provided for insuring that track 160 is tensioned and tightened around wheels 134, 136, 138, 142, 144, 150, and 152 and sprockets 146 and 154.

Track member 85–87 are formed in a similar manner as described with respect to track member 84 and are pivotably attached to the second end of axle 20 and the first and second ends of axle 22, respectively.

It thus can be seen that track members 84–87 have the shape of an obtuse triangle having a first side 162, a second side 164, and a third side 166. First side 162 has a length greater than that of second side 164. The obtuse angle is located between first side 162 and second side 164.

The track members 84–87 rest in its equilibrium position on first side 162 when vehicle 10 travels forward on various travel surfaces, rests in its equilibrium position on second side 164 when vehicle 10 travels rearward on soft travel surfaces, and rests alternately on first side 162 and second side 164 when vehicle 10 travels on a rough surface as will be described further hereinafter. Due to the preferred shape of track members 84–87, side 164 in a forward motion and side 162 in a rearward motion creates an angular approach surface to enable track members 84–87 of vehicle 10 to climb over obstacles while track members 84–87 are being propelled as will be explained further hereinafter.

It should be noted that track 160 is driven by sprocket 154 which is located between first side 162 and third side 166 of track member 84 which results in the greatest percentage of contact with sprocket 154 which prevents sprocket 154 from slipping and losing contact with respect to track 160 under certain conditions as when the drive sprocket is located between the second and third sides as in prior vehicles.

It should be additionally noted that the location of the pivot point of frame members 130 and 132 and the shape of track members 84–87 create a balanced action of track members due to the torque generated by the power train means and transferred to track 160 by sprockets 154, 156, and 158 and chain 159. When vehicle 10 is propelled in a forward direction, the torque generated and the traction created by track 160 contacting the travel surface pulls the rear drive sprocket 154 and track 160 downward, thus creating maximum traction. Similarly, when vehicle 10 is propelled in a reverse direction, the torque generated and the traction created by track 160 contacting the soft travel surface pulls the sprocket 154 and track 160 upward, transferring the weight of vehicle 10 to second side 164 and creating an approach angle on side 162 to enable vehicle 10 to climb over obstacles while being propelled in a reverse motion, as explained with respect to side 162 in a forward motion hereinbefore and hereinafter.

It should further be noted that wheels 134, 136, and 138, idler wheels 150 and 152, and sprocket 154 press against track 160 to insure that track 160 uniformly engages the travel surface to obtain maximum contact surface and frictional forces between the travel surface and track 160.

It can now be appreciated that the corner of the obtuse triangle between first side 162 and second side 164 is formed and defined by wheels 134 and 136, the corner between second side 164 and third side 166 is formed and defined by wheels 142 and 144 and sprocket 146, and the corner between third side 166 and first side 162 is formed and defined by wheels 150 and 152 and sprocket 154 of track members 84–87.

It should further be noted that track member 84 is pivotally mounted to the first end of first axle 20; track member 85 is pivotally mounted to the second end of first axle 20; track member 86 is pivotally mounted to the first end of second axle 22; and track member 87 is pivotally mounted to the second end of second axle 22. Additionally, it should be noted that track member 86 lies directly behind and in line with track member 84 such that when vehicle 10 moves in a straight, forward direction track member 86 follows in the same track rut as made by track member 84 and when vehicle 10 moves in a straight, rearward direction, track member 84 follows in the same track rut as made by track member 86. Likewise, it should be noted that track member 87 lies directly behind and in line with track member 85 such that when vehicle 10 moves in a straight, forward direction, track member 87 follows in the same track rut as made by track member 85 and when vehicle 10 moves in a straight, rearward direction, track member 85 follows in the same track rut as made by track member 87.

Also, it should be noted that body and frame member 16 of first unit 12 may include apparatus commonly included in transportation vehicles such as windshield member 168, storage space 170 located behind seat 98 for receiving miscellaneous material or for receiving additional passengers if desired, a hard or soft cover, not shown, for enclosing the driver, which may be of a removable or nonremovable type, and similar apparatus. Body and frame member 18 of second unit 14 may also include apparatus such as storage space 172 located around motor 62 and member 68 for receiving miscellaneous material, gas tanks, not shown, for supplying fuel to motor 62, a hard or soft cover, not shown, for enclosing body and frame member 18, which may be of the removable or nonremovable type, and similar apparatus.

In the preferred embodiment, vehicle 10 is approximately 4 feet (1.22 meters) wide, specifically 47 inches (1.2 meters) wide, 8 feet (2.44 meters) long, specifically 103 inches (2.61 meters) long, and approximately 5 feet (1.53 meters) high, specifically 65 inches (1.65 meters) high. The approximate width of track 160 is 12 inches (30.48 centimeters) wide. The approximate weight of vehicle 10 is 1000 pounds (453.6 kilograms). The speed of vehicle 10 is approximately 25 miles (40.23 kilometers) per hour in high gear, 12 miles (20.12 kilometers) per hour in low gear, and 8 miles (12.87 kilometers) per hour in reverse. The draw bar pull is approximately 1000 pounds (453.6 kilograms) depending on ground conditions and the load capacity is approximately 800 pounds (362.88 kilograms) plus the operator. Vehicle 10, in the preferred embodiment described, has a turning radius of approximately 10 feet (3.02 meters).

OPERATION

When a person desires to use vehicle 10 of the present invention for his/her personal transportation, the driver places any material desired to be transported in storage spaces 170 and 172 and the driver enters unit 12 and sits in seat 98. After starting motor 62, the driver engages transmission member 68 by means of lever 96. The driver then presses down on accelerator pedal 94 causing shaft 64 of motor 62 to rotate and transfer the power received from motor 62, via the power train means as described hereinbefore, to provide movement of track members 84–87 thus causing the vehicle to move on the travel surface.

If the driver wishes to steer vehicle 10, the driver may turn steering wheel 106 thereby rotating shaft 100 and moving arms 108, 110, 118, 122, and 124 causing second unit 14 to pivot about axis A as is diagrammatically shown in FIG. 4 and thereby causes vehicle 10 to change direction as disclosed hereinbefore.

Now that the basic teachings and the operational features of vehicle 10 have been explained, the numerous advantages and advancements over the prior art can be better seen. Vehicles prior to the present invention suffered from severe difficiencies and problems. Some such vehicles were not intended for the personal transportation of the driver, but instead were intended for the transportation of numerous persons or of miscellaneous material. Some such vehicles had only two track members. Some such vehicles were of a very large size and therefore inherently of great weight. Second, some such vehicles had very poor weight distribution. For example, in the articulated type prior vehicles, the majority of the weight including the driver, motor, and clutch and transmission members, were located in the first unit. Therefore, in a non-load condition, i.e. where no material is located within the second unit, there was comparatively little or no weight in the second unit. Therefore, the track members of the second unit had very low traction ability. In addition, the first unit had a very high weight per square inch of the track engaging the travel surface value. Therefore, these prior vehicles had very poor floatation ability and therefore could not travel on travel surfaces having poor support characteristics, such as marshland and soft snow. Similarly, vehicles of the non-articulated type suffered from disadvantages similar to those of articulated vehicles.

The present invention solves these and other problems and disadvantages of prior vehicles by providing a small, personal, all terrain vehicle of the multiple unit type. First, since the driver is located in first unit 12 and motor 62 and transmission member 68 are located in second unit 14, the present invention provides advantageous weight distribution. The weight of the driver of vehicle 10 is located in first unit 12 and thus is transferred via members 84 and 85 to the travel surface, to provide substantial traction to track members 84 and 85. The weight of motor 62 and member 68 and any additional material located in space 172 is located in second unit 14 and thus transferred via track members 86 and 87 to the travel surface, to provide substantial traction to track members 86 and 87. This weight distribution feature and the track construction feature for allowing the weight transferred to the track members to be uniformally spread about track 160, as explained hereinbefore, insure that track members 84–87 have a maximum track contact surface and further provide substantial traction of track members 84–87 to drive vehicle 10.

It should further be noted that due to the weight distribution of the vehicle of the present invention, second unit 14 has high traction abilities even under no-load conditions. Additionally, vehicle 10 has a greater floatation ability in that the weight of vehicle 10 is distributed to both units 12 and 14 and thus to track members 84 – 87 such that each track member 84–87 has less weight per square inch of track 160 engaging the travel surface. Therefore, vehicle 10 has a far greater ability to move about travel surfaces having very poor support characteristics such as marshland and soft snow.

Further, the present invention allows vehicle 10 to travel over different types of terrain including rough, bumpy, or uneven terrain, steep incline terrains, and other and similar types of terrain due to the preferred shape of track members 84–87, the pivotally mounting of track members 84–87 to first and second units 12 and 14, and the pivotable and rotatable interconnection of first unit 12 to second unit 14. This feature is best explained by examining figures 5–9 in view of FIGS. 1–3. It should be noted that in all the figures, all four track members 84–87 engage the travel surface, even if the travel surface is a very rough terrain. Further, track members 84–87 give maximum traction, stability, and floatation per square inch of track 160 engaging the travel surface even while travelling over such terrains. Therefore, vehicle 10 of the present invention is a very flexible and stable vehicle that provides maximum traction on all types of terrain.

FIGS. 5–9 diagrammatically illustrate the operation of vehicle 10 as it passes over a boulder 200. It should be noted that although a single illustration of the operation of vehicle 10 will be explained, persons skilled in the art will realize the operation of vehicle 10 of the present invention as it travels over other types of travel surface terrains is similar.

Specifically, FIG. 5 shows vehicle 10 travelling on a smooth travel surface. As explained hereinbefore first side 162 of each track members 84–87 in their equilibrium position engage and contact the travel surface.

For the sake of example, assume that a boulder 200 lies within the path of track members 84 and 86. As the vehicle 10 approaches boulder 200, boulder 200 will first engage second side 164 of track member 84. Therefore, due to the angled surface of second side 164 of track member 84, track member 84 rotates on the first end of axle 20, such that track member 84 will ride up on boulder 200 so that side 162 of track member 84 rolls over boulder 200 as diagrammatically illustrated in FIG. 6.

Upon continued movement, track member 84 continues to rotate on the first end of axle 20 and also first unit 21 rotates about the longitudinal axis of vehicle 10 with respect to second unit 14, as diagrammatically illustrated in FIG. 7. It should be noted that second unit 14 remains in its equilibrium position such that first sides 162 of track members 86 and 87 engage the travel surface.

Upon continued movement, track member 84 travels over boulder 200 and thus track member 84 rotates on axle 20 back to its equilibrium position and first unit 12 rotates about the longitudinal axis to its equilibrium position with respect to second unit 14, as shown diagrammatically in FIG. 5.

Upon further continued movement, track member 86 will engage and travel over boulder in a similar manner as explained previously with respect to track member 84. Specifically, track member 86 will rotate about the first end of axle 22 and second unit 14 will rotate about the longitudinal axis of vehicle 10 with respect to first unit 12 as diagrammatically shown in FIGS. 8 and 9.

As seen in FIGS. 8 and 9, first side 162 of track members 84 and 85 totally engages the travel surface and first side 162 of track member 87 substantially engages the travel surface. Also, track member 86 further engages the travel surface even in view of the large obstacle located in its path. Therefore, all four track members 84–87 simultaneously engage the travel surface, even in the very rough terrain set forth in this example.

The ability of vehicle 10 to have all four track members 84–87 simultaneously engage the travel surface arises largely from the use of member 32 and the pivotably mounting of track members 84–87 on axles 20 and 22, which was unknown in the prior art before the advent of the present invention. No known vehicle of the small, personal, all terrain type utilized the combination of these elements as set forth in the present invention.

It should further be noted that due to flexible connectors 46 and 48, universal joints 50 and 54, and coupling 52, the drive shaft of vehicle 10 flexes as second unit 14 pivots about the longitudinal axis and axis A with respect to unit 12.

Therefore, it can be seen that vehicle 10 provides a relatively smooth carriage of the driver and the material in that the roughness of the terrain is largely absorbed due to the rotatably mounting of track members 84–87 and the rotatability of member 32 interconnecting first and second units 12 and 14. Further, track members 84–87 provide a maximum of contact surface of track 160 engaging the travel surface. Additionally, due to the balanced action of track members 84–87, maximum traction is created between track 160 of track members 84–87 and the travel surface. Thus vehicle 10 has large floatation ability and also has large traction ability. Additionally, vehicle 10 is very stable due to the design features previously set forth and the low mass profile of vehicle 10.

Now that the operation of the present invention has been explained, other advantages of the present invention can be explained. When vehicle 10 travels rearward on a hard, smooth travel surface, track members 84–87 will rest on the travel surface on first sides 162. However, if the travel surface is soft, tracks 84–87 will pivot unto second sides 164 due to the torque generated and traction created as explained hereinbefore. Therefore a suprising result arises if vehicle 10 should become stuck in very soft terrain when traveling in a forward direction. If vehicle 10 should become stuck, track members 84–87 can dig into the terrain surface. When the operator reverses direction of vehicle 10 on soft terrain, track members 84–87 will pivot such that second side 164 engages the travel surface and therefore changes the traction position. Therefore, track members 84–87 are lifted out of the track ruts dug in the travel surface and vehicle 10 will be able to travel in a reverse direction. Vehicle 10 is thus able to be operated over travel surfaces which caused other vehicles great difficulty.

Thus since the invention disclosed herein may be embodied in other specific forms without departing from the spirit or the general characteristics thereof, some of which forms have been indicated, the embodiments described herein are to be considered in all respects to be illustrative and not restrictive. The scope of the invention is indicated by the appended claims rather than by the foregoing description and all changes which come within the meaning and range of equivalency of the claims are intended to be embraced therein.

What is claimed is:

1. A small, personal, all terrain vehicle of the articulated, multi-unit type primarily for transporting a single person, comprising, in combination: a first unit including a first axle having a first end and a second end, and a second unit including a second axle having a first end and a second end; a first track member pivotally mounted to the first end of the first axle; a second track member pivotably mounted to the second end of the first axle; a third track member pivotably mounted to the first end of the second axle; a fourth track member pivotably mounted to the second end of the second axle; first means for connecting the second unit to the first unit, for allowing the second unit to rotate about a longitudinal axis parallel to the intended movement direction with respect to the first unit, and for allowing the second unit to pivot about an axis perpendicular to the longitudinal axis with respect to the first unit; means for receiving and allowing the seating of a driver within the first unit; means, located in the first unit, for steering the all terrain vehicle by pivoting the second unit with respect to the first unit about the axis perpendicular to the longitudinal axis of the first means; a motor located in the second unit; power train means for providing movement of the first, second, third, and fourth track members from the power received from the motor, wherein the all terrain vehicle provides advantageous weight distribution in that the weight of the driver of the all terrain vehicle is located in the first unit to provide substantial traction to the first and second track members and the weight of the motor of the all terrain vehicle is located in the second unit to provide substantial traction to the third and fourth track members, and wherein the first means and the pivotable interconnection of the first, second, third, and fourth track members to the first and second axles assure that all four track members engage the travel surface, even if the travel surface is a very rough terrain.

2. The small, personal, all terrain vehicle of claim 1 wherein the first means comprises, in combination: a first member rigidly attached to the first unit, a second, cylindrical member having a diameter, with the second, cylindrical member being pivotably attached to the first member about the axis perpendicular to the longitudinal axis; a third, cylindrical member having a diameter slightly larger than the diameter of the second, cylindrical member, with the third, cylindrical member being rotatably attached around and upon the second, cylindrical member about the longitudinal axis, and with the third, cylindrical member being rigidly attached to the second unit.

3. The small, personal, all terrain vehicle of claim 2, wherein the steering means comprises, in combination: a first arm rigidly attached to the second cylindrical member; at least one linkage arm connected to the first arm; and means for moving the linkage arm in a longitudinal direction.

4. The small, personal, all terrain vehicle of claim 3, wherein the steering means comprises: a second linkage arm having a first end and a second end; a third linkage arm having a first end pivotably connected to the second end of the second linkage arm and having a second end pivotably connected to the first unit; and a fourth linkage arm having a first end pivotably connected to the third linkage arm at a point between the first and second ends of the third linkage arm and having a second end pivotably connected to the first arm.

5. The small, personal, all terrain vehicle of claim 4, wherein the means for moving the linkage arm in a longitudinal direction comprises, in combination: a crank arm, with the first end of the second linkage arm being pivotably connected to the crank arm; a rotatable shaft rotatably carried by the first unit and having a first end, with the rotatable shaft being operatively connected to the crank arm; and a steering wheel attached to the first end of the rotatable shaft for rotating the shaft causing movement of the first arm and the second, third, and fourth linkage arms thereby causing the second, cylindrical member to pivot about the vertical axis with respect to the first member rigidly attached to the first unit.

6. The small, personal, all terrain vehicle of claim 5 wherein the first and second axles are formed of hollow housing members, and wherein the power train means comprises, in combination: a first axle shaft rotatably carried within the first axle; a second axle shaft rotatably carried within the second axle; with the first and second axle shafts each including a first end and a second end; means located on the first and second ends of the axle shafts for providing power to the track members; a first differential member operatively connected to the first axle shaft; a second differential member operatively connected to the second axle shaft; a drive shaft operatively connecting between the first and second differential members, with the drive shaft passing through the second, cylindrical member and through the third, cylindrical member; means for allowing the drive shaft to flex as the all terrain vehicle moves about the travel surface; means for allowing the drive shaft to increase in length as the all terrain vehicle moves about the travel surface; and means for operatively connecting the motor to the drive shaft.

7. The small, personal, all terrain vehicle of claim 6 wherein the track members have the shape of an obtuse triangle having a first side, a second side, and a third side, with the first side being of a greater length than the second side, with the obtuse angle located between the first side and the second side, wherein the track members rest on the first side in its equilibrium position when the all terrain vehicle travels forward on various travel surface and the second side provides an angular approach surface for enabling the track member to climb over obstacles, and rest on the second side in its equilibrium position when the all terrain vehicle travels rearward on a soft travel surface and the first side provides an angular approach surface for enabling the track member to climb over obstacles, and wherein due to the pivotably mounting of the track members on the axles, the track members rest on alternately the first and second sides of the track members when the all terrain vehicle travels on uneven terrain travel surfaces.

8. The small, personal, all terrain vehicle of claim 7 wherein the track members comprises, in combination: a first track frame member and a second track frame member pivotally mounted transversely and symetrically about a pivot point around the axis in a spaced, parallel relation, with the track frame members having a forward end and a rearward end; first idler wheel rotatably carried by the first ends of the first and second track frame members; second idler wheel rotatably carried by the second ends of the first and second track frame members; intermediate wheels rotatably carried by the first and second track frame members and located adjacent to the axle; a track extending around the first and second idler wheels and the intermediate wheels; and means for receiving the power from the power providing means for driving the track.

9. The small, personal, all terrain vehicle of claim 8 wherein the track members comprise at least a first intermediate wheel and a second intermediate wheel, with the pivot point of the first and second track frame members being located above and between the pivot points of the first and second intermediate wheels and the pivot points of the first and second intermediate wheels being located on opposite sides of and equadistant from the pivot point of the first and second track frame members to create a balanced action with regard to the track members and the travel surface, and wherein the corner between the first and second side of the obtuse triangle is defined by the first intermediate wheel; the corner between the second and third side of the obtuse triangle is defined by the first idler wheel; and the corner between the third and first side of the obtuse triangle is defined by the second idler wheel.

10. The small, personal, all terrain vehicle of claim 9 wherein the all terrain vehicle is approximately 4 feet wide and 8 feet long.

11. The small, personal, all terrain vehicle of claim 1 wherein the track members have the shape of an obtuse triangle having a first side, a second side, and a third side, with the first side being of a greater length than the second side, with the obtuse angle located between the first side and the second side, wherein the track members rest on the first side in its equilibrium position when the all terrain vehicle travels forward on various travel surface and the second side provides an angular approach surface for enabling the track member to climb over obstacles, and rest on the second side in its equilibrium position when the all terrain vehicle travels rearward on a soft travel surface and the first side provides an angular approach surface for enabling the track member to climb over obstacles, and wherein due to the pivotably mounting of the track members on the axles, the track members rest on alternately the first and second sides of the track members when the all terrain vehicle travels on uneven terrain travel surfaces.

12. The small, personal, all terrain vehicle of claim 11 wherein the track members comprises, in combination: a first track frame member and a second track frame member pivotally mounted transversely and symetrically about a pivot point around the axis in a spaced, parallel relation, with the track frame members having a forward end and a rearward end; first idler wheel rotatably carried by the first ends of the first and second track frame members; second idler wheel rotatably carried by the second ends of the first and second track frame members; intermediate wheels rotatably carried by the first and second track frame members and located adjacent to the axle; a track extending around the first and second idler wheels and the intermediate wheels; and means for receiving the power from the power providing means for driving the track.

13. The small, personal, all terrain vehicle of claim 12 wherein the track members comprise at least a first intermediate wheel and a second intermediate wheel, with the pivot point of the first and second track frame members being located above and between the pivot points of the first and second intermediate wheels and the pivot points of the first and second intermediate wheels being located on opposite sides of and equadistant from the pivot point of the first and second track frame members to create a balanced action with regard to the track members and the travel surface, and wherein the corner between the first and second side of the obtuse triangle is defined by the first intermediate wheel; the corner between the second and third side of the obtuse triangle is defined by the first idler wheels; and the corner between the third and first side of the obtuse triangle is defined by the second idler wheel.

* * * * *